April 5, 1960  L. S. BILLMAN  2,931,172
THRUST REVERSERS
Filed Feb. 26, 1957
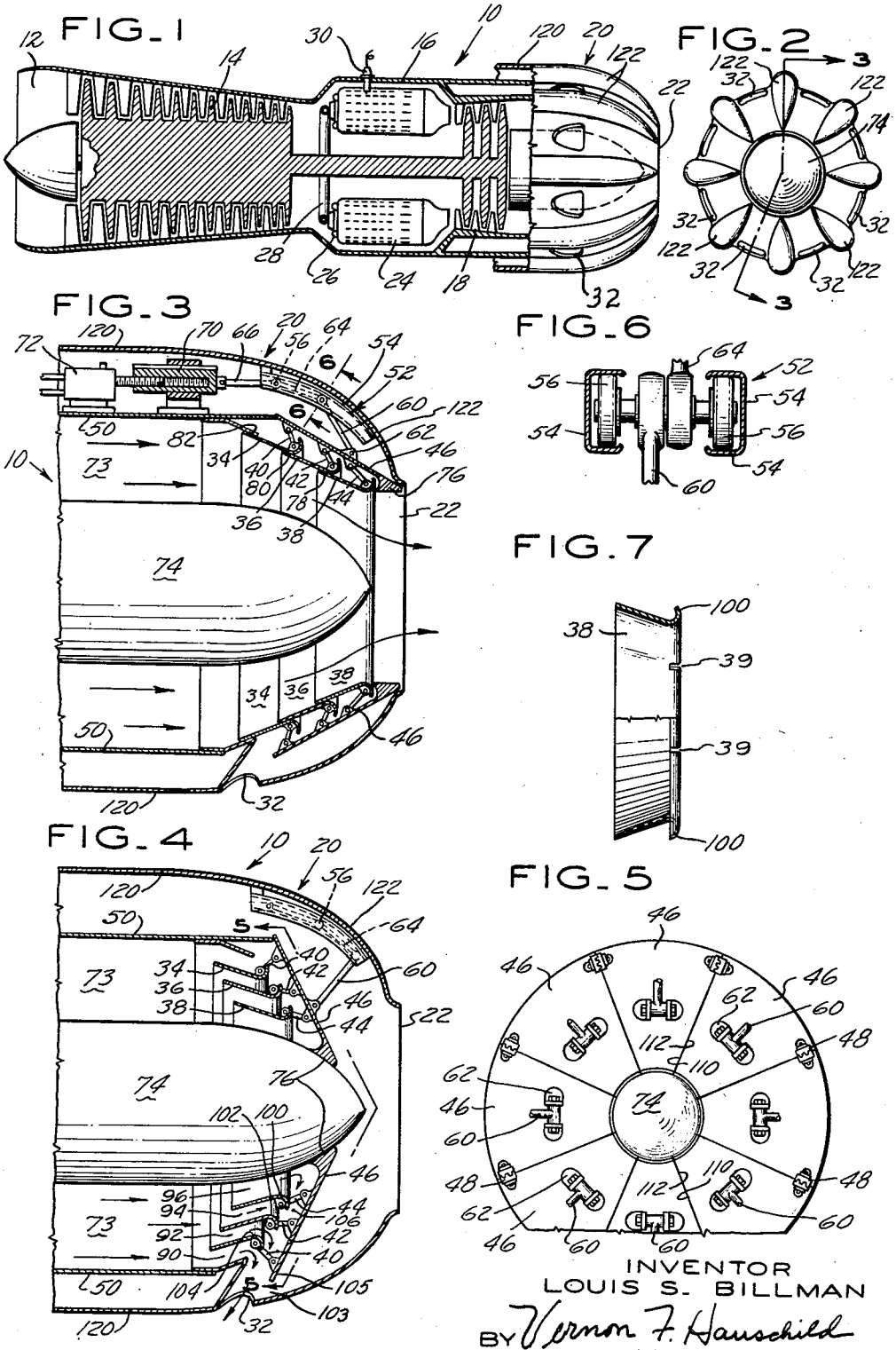
INVENTOR
LOUIS S. BILLMAN
BY Vernon F. Hauschild
ATTORNEY ns # United States Patent Office 2,931,172
Patented Apr. 5, 1960

2,931,172
THRUST REVERSERS

Louis S. Billman, West Hartford, Conn., assignor to United Aircraft Corporation, East Hartford, Conn., a corporation of Delaware Application February 26, 1957, Serial No. 642,489

4 Claims. (Cl. 60—35.54)

This invention relates to thrust reversal and more particularly to the reversal of the thrust of a modern aircraft turbojet engine.

It is an object of this invention to provide thrust reversal means which are light in weight, simple in construction, and which will not adversely affect normal powerplant operation.

It is a further object of this invention to provide thrust reversal means which are capable of accomplishing both minimal or no thrust reversal by cooperating with other powerplant parts to form a completely sealed gas passage leading to the normal exhaust outlet such that all exhaust gas is discharged therethrough and maximum or total thrust reversal by completely blocking off the normal exhaust gas outlet and directing all exhaust gases thru outlets, nozzles or openings directed in reversing direction, that is, directed opposite to normal gas flow and discharge.

It is a further object of this invention to provide thrust reversal means which are capable of accomplishing preselected degrees of thrust reversal by varying the thrust reverser position between the position of no-thrust reversal and the position of total thrust reversal.

It is a further object of this invention to provide thrust reversal means which will have minimal external drag.

Other objects and advantages will be apparent from the specification and claims, and from the accompanying drawings which illustrate an embodiment of the invention:

In the drawings:

Fig. 1 is a cross-sectional view of a modern aircraft turbojet powerplant utilizing my thrust reverser.

Fig. 2 is a rear view of the engine configuration shown in Fig. 1 utilizing my thrust reverser.

Fig. 3 is a sectional view along line 3—3 of Fig. 2 showing my thrust reverser in its completely retracted position wherein all exhaust gas is being discharged thru the normal exhaust gas outlet.

Fig. 4 is a cross-sectional showing of my thrust reverser comparable to Fig. 3 in which the thrust reverser is shown in its fully operable position wherein all exhaust gas is being discharged in a direction to effect thrust reversal.

Fig. 5 is a view taken along line 5—5 of Fig. 4.

Fig. 6 is a view taken along line 6—6 of Fig. 3.

Fig. 7 is an enlarged schematic partially in section of one of the reversing rings used in my thrust reverser.

Referring to Fig. 1 we see modern aircraft turbojet powerplant 10 comprising air inlet section 12, compressor section 14, combustion section 16, turbine section 18, thrust reverser unit 20 and normal exhaust outlet 22. Air enters engine or powerplant 10 thru air inlet section 12, is compressed as it passes thru compressor section 14 and is heated in combustion chamber section 16. Heat is imparted to the air by combustion which occurs in combustion chambers 24. Combustion chambers 24 are fed fuel thru a plurality of fuel nozzles 26 which, in turn, are fed fuel thru fuel manifold 28. The atomized fuel entering combustion chambers 24 is ignited by spark plug 30 or any convenient ignition means. The heated gas then passes from combustion section 16 thru turbine section 18 and will then normally be discharged thru normal exhaust gas outlet 22 when the thrust reverser unit 20 is in the position shown in Fig. 3. Should the thrust reverser unit be in the position shown in Fig. 4, no exhaust gas will pass thru normal exhaust gas outlet 22 but all will pass thru the plurality of reversing slots 32.

As best shown in Figs. 3 and 4, thrust reverser unit 20 comprises a plurality of axially movable concentric rings 34, 36 and 38 which are pivotally attached to and each is supported by a plurality of circumferentially spaced links 40, 42 and 44, respectively. As shown in Figs. 3, 4 and 7, reversing rings 34, 36 and 38 are frusto-conical in shape with flow reversing lips 100, 102 and 104 at their downstream ends and are progressively smaller diametrically in a downstream direction. Links 40, 42 and 44 are pivotally attached at one of their ends to concentric reversing rings 34, 36 and 38 and are pivotally attached at their outer ends to one of the exhaust flaps 46. Slot 39 may be needed in the rings such as 38 to permit link actuation. Exhaust flaps 46 are pivotally attached at one of their ends by attachment means 48 to exhaust liner 50. Flaps 46 are located circumferentially about gas passage liner 50 and pivotally attached thereto. Flaps 46 are located downstream of reversing rings 34, 36 and 38 and are pivotable to either increase or decrease gas passage area. Exhaust flaps 46 are actuated by roller and track unit 52 which comprises track 54 and one or more roller units 56. Link 60 is pivotally attached to flaps 46 by attachment means 62. Link 60 is also pivotally attached to one of the roller units 56. If more than one roller unit 56 is used, link 64 is pivotally attached to both roller units 56. Link 66 is pivotally attached to roller unit 56 and is caused to translate in an axial direction by acme screw unit 70 which is securely attached to gas passage duct 50. Air motor 72, which is actuated by compressed air from the powerplant compressor 14, causes acme screw unit 70 to rotate in either a clockwise or a counterclockwise direction to cause links 66, 64 and 60 to move within track 54 thereby causing flaps 46 to open, that is, move in a direction of maximum gas passage area, or cause flaps 56 to close, that is, move in a direction of minimum gas passage area.

It should be borne in mind that any control means, such as a pressurized piston and cylinder arrangement may be used as the actuating means and modern controls may be used for intermediate thrust reverser and flap positions. The acme screw is shown to illustrate a simple configuration capable of self-locking in intermediate positions.

As will be seen in Fig. 3, after passing thru turbine section 18 of engine 10, the exhaust gas is passed thru the annular gas passage 73 formed between liner 50, tailcone 74, the plurality of convergently abutting concentric reversing rings 34, 36 and 38 and contoured lips 76 on flaps 46 and thence discharged to atmosphere in a thrust generating function thru normal exhaust gas outlet or nozzle 22. It will be noted that the concentric reversing rings 34, 36 and 38 abut one another in the position shown in Fig. 3 to smoothly blend with the associated parts 50, 74 and 76 to form a smooth gas passage 73. It will be obvious that the pressure of the gas passing inboard of concentric converging reversing rings 34, 36, and 38 will cause each ring to be forced radially outwardly and rearwardly to form a tight seal along surfaces 78, 80 and 82. When thrust reverser unit is in the position shown in Fig. 3, the plurality of flaps 46 have been caused to pivot by the actuating unit in a counterclockwise direction, as shown, to cause reversing rings 34, 36 and 38 to move to the position shown and to further cause contoured lips 76 on flaps 46 to smoothly blend with reversing ring 38 to form a smooth passage between reversing ring 38 and exhaust gas outlet 22. When the thrust reverser unit 20 is in the position shown in Fig. 3, all exhaust gases are being discharged thru the normal exhaust gas outlet 22 and no exhaust gas is being discharged thru reversing slots 32 since the plurality of concentric reversing rings 34, 36 and 38 block the entry to reversing slots 32.

As actuating unit 72 and acme screw unit 70 causes links 66, 64 and 60 to move so as to pivot flaps 46 in a clockwise direction, when viewed as in Figs. 3 and 4, concentric reversing rings 34, 36 and 38 will move in an axially forward direction and will gradually separate from a radial aspect to provide a plurality of concentric flow reversing gas passages 90, 92, 94 and 96, each of which becomes larger as reversing rings 34, 36, and 38 move farther forward axially until they reach their maximum passage area when the reversing rings 34, 36, and 38 are in the position shown in Fig. 4. Fig. 4 demonstrates the thrust reverser 20 position of maximum or total thrust reversal. In this position the plurality of flaps 46 have pivoted such that contoured lip 76 on each flap 46 abuts against tailcone 74 to form a rearwardly convergent wall to completely block off the gas passage leading to exhaust outlet 22. With thrust reverser mechanism 20 in the position shown in Fig. 4 all gas being discharged by engine 10 is caused to pass thru gas passages 90, 92, 94, and 96 and be turned by flow reversing lips 100, 102, and 104 which are a part and form the axial downstream portion or trailing edge of concentric reversing rings 38, 36, and 34, respectively. After being turned so as to flow in a substantially radially outwardly direction by the flow reversing lips, the exhaust gas is then passed thru gas passage 106 formed between flap 46 and reversing rings 34, 36, and 38 and is directed thru reversing slots 32 in such a direction so as to have a substantial component in the direction opposite to normal exhaust discharge thereby effecting a thrust reversal.

It should be noted that while in the intermediate positions between the extreme total reversal and no-reversal positions shown in Figs. 3 and 4, flaps 46 partially block exhaust gas passage 73 and concentric reversing rings 34, 36, and 38 form flow reversing gas passages to direct a portion of the total exhaust gas flow thru reversing gas slots 32 while the remainder is discharged thru normal exhaust gas outlet 22. Since actuating unit 72 and acme screw unit 70 are capable of positioning flaps 46 and rings 34, 36 and 38 in any desired position between the maximum positions shown in Fig. 3 and Fig. 4, this thrust reverser unit 20 is capable of accomplishing preselected, varying degrees of thrust reversal.

Referring to Fig. 5 it should be noted that when thrust reverser unit 20 is in the position shown in Fig. 4, the side surfaces 110 and 112 of adjacent flaps 46 abut so as to form a seal therebetween. This, in conjunction with the seal formed between contoured lips 76 and tailcone 74, completely blocks exhaust gas flow to exhaust outlet 22. Fig. 5 shows that attachment unit 48 is utilized between adjacent pivotal flaps 46 such that adjacent pivotal flaps 46 are geared to one another to insure that the plurality of pivotal flaps 46 pivot radially outwardly or radially inwardly in unison. This unified pivoting is highly desirable to insure symmetry of exhaust gas discharge and further to insure that should one of the flap actuating systems be damaged, the flap could still be actuated. Also, this connecting unit 48 permits the use of fewer actuating units.

Further, in connection with Fig. 4 it should be noted that there is a radial clearance 103 between the outer end 105 of flaps 46 and outlet 32 so that when flaps 46 are closed and the exhaust gases from passage 73 are flowing through outlet 32, an aspirator effect is established to draw gas through exhaust outlet 22 and clearance 103 to join the exhaust gas from passage 73 in being discharged through outlet 32.

Outer fairing or shroud 120 is provided as the external part of thrust reverser mechanism 20 to reduce external drag and to provide flow reversing slots or nozzles 32 and further to provide bulge units 122 to receive the plurality of actuating units comprising 72, 70 and 52 which may be spaced circumferentially about gas passage duct 50. It will be noted, as shown in Fig. 2, that outer fairing 120 is reduced in diameter between bulge units 122.

It is to be understood that the invention is not limited to the specific embodiment herein illustrated and described, but may be used in other ways without departure from its spirit as defined by the following claims.

I claim:

1. In a gas passage concentric about an axis a thrust reversal mechanism comprising a plurality of reversing rings concentric about said axis and of progressively decreasing radial size in a downstream direction in said passage and each being of frusto-conical shape and having a flow reversing lip at its downstream end, a plurality of pivotable flaps located downstream of said reversing rings and circumferentially about and defining the downstream end of the gas passage and pivotally attached to and supporting said reversing rings to cause axial translation of said rings in unison in response to flap pivot movement, means to pivot said flaps in a direction to increase gas passage area and thereby translating said reversing rings axially in one direction to cause said reversing rings to abut and form in cooperation with said flaps a smooth convergent gas passage with a circular exhaust outlet and to pivot said flaps in the opposite direction to decrease gas passage area and thereby translate said reversing rings axially in the opposite direction to cause said reversing rings to approach radial alignment and define concentric flow reversing passages therebetween and further to cause said flaps to abut after maximum movement in said opposite direction and block the gas passage and coact with said reversing rings to form a flow reversing passage downstream of said reversing rings.

2. In a gas passage concentric about an axis a thrust reversal mechanism comprising a plurality of reversing rings concentric about said axis and of progressively decreasing radial size in a downstream direction in said passage and each being of frusto-conical shape and having a flow reversing lip at its downstream end, a plurality of pivotable flaps located downstream of said reversing rings and circumferentially about and defining the downstream end of the gas passage and pivotally attached to and supporting said reversing rings to cause axial translation of said rings in unison in response to flap pivot movement, means to pivot said flaps in a direction to increase gas passage area and thereby translating said reversing rings axially in one direction to cause said reversing rings to abut and form in cooperation with said flaps a smooth convergent gas passage with a circular exhaust outlet and to pivot said flaps in the opposite direction to decrease gas passage area and thereby translate said reversing rings axially in the opposite direction to cause said reversing rings to approach radial alignment and define concentric flow reversing passages therebetween and further to cause said flaps to abut after maximum movement in said opposite direction to form a rearwardly convergent wall and block the gas passage and coact with said reversing rings to form a flow reversing passage downstream of said reversing rings, means to actuate said flaps, and means to cause said flaps to pivot in unison.

3. In a gas passage concentric about an axis a thrust reversal mechanism comprising a plurality of reversing rings concentric about said axis and of progressively decreasing radial size in a downstream direction in said passage and each being of frusto-conical shape and having a flow reversing lip at its downstream end, a shroud surrounding the gas passage with openings therein directed opposite to normal gas flow, a plurality of pivotable flaps located downstream of said reversing rings and circumferentially about and defining the downstream end of the gas passage and pivotally attached to and supporting said reversing rings to cause axial translation of said rings in unison in response to flap pivot movement, said flaps having radially outer ends spaced from and in substantial radial alignment with said shroud openings, means to pivot said flaps in a direction to increase gas passage area and thereby translating said reversing rings axially in one direction to cause said reversing rings to abut and form in cooperation with said flaps a smooth convergent gas passage with a circular exhaust outlet and to pivot said flaps in the opposite direction to decrease gas passage area and thereby translate said reversing rings axially in the opposite direction to cause said reversing rings to approach radial alignment and define concentric flow reversing passages therebetween and further to cause said flaps to abut after maximum movement in said opposite direction to form a rearwardly convergent wall and block the gas passage and coact with said reversing rings to form a flow reversing passage downstream of said reversing rings and cooperate with said reversing rings to direct the gas flow from said gas passage through said shroud openings thereby forming an aspirator with respect to the gas downstream of said flaps to cause gas to flow from downstream of said flaps through said space between said flaps and said opening to join the flow of gas from said gas passage through said openings.

4. In a gas passage concentric about an axis a thrust reversal mechanism comprising a plurality of reversing rings concentric about said axis and of progressively decreasing radial size in a downstream direction in said passage and each being of frusto-conical shape and having a flow reversing lip at its downstream end, a shroud surrounding said gas passage and having openings therein directed opposite to normal gas flow, a plurality of flaps forming the downstream end of said gas passage located downstream of said reversing rings and further located circumferentially about and pivotally attached to the gas passage and pivotally attached to and supporting said reversing rings for axial translation in response to flap pivot motion, said flaps having radially outer ends spaced from and in substantial radial alignment with said shroud openings, means to pivot said flaps radially outward and thereby translate said reversing rings axially in a downstream direction until said reversing rings abut to form a smooth convergent gas passage in cooperation with said flaps culminating in a circular exhaust outlet of maximum area and to pivot said flaps radially inward to cause said flaps to abut in sealing relation to block the gas passage and coact with said reversing rings to form a flow reversing passage downstream of said reversing rings and thereby translate said reversing rings axially in an upstream direction to form increasingly large concentric flow reversing passages as said reversing rings approach radial alignment and cooperate with said flaps to divert gas flow from said gas passage through said shroud openings thereby forming an aspirator with respect to the gas downstream of said flaps to cause gas to flow from downstream of said flaps through said space between said flaps and said opening to join the flow of gas from said gas passage through said openings.

References Cited in the file of this patent

UNITED STATES PATENTS

| | | |
|---|---|---|
| 2,509,238 | Martin | May 30, 1950 |
| 2,557,435 | Imbert | June 19, 1951 |
| 2,667,185 | Beavers | Jan. 26, 1954 |
| 2,693,078 | Laucher | Nov. 2, 1954 |
| 2,797,548 | Marchal et al. | July 2, 1957 |

FOREIGN PATENTS

| | | |
|---|---|---|
| 204,949 | Australia | Dec. 12, 1956 |
| 739,500 | Great Britain | Nov. 2, 1955 |